United States Patent [19]
Hirao et al.

[11] Patent Number: 5,902,542
[45] Date of Patent: May 11, 1999

[54] METHOD OF PRODUCING SILICON NITRIDE CERAMICS HAVING THERMAL HIGH CONDUCTIVITY

[75] Inventors: Kiyoshi Hirao; Koji Watari; Motohiro Toriyama; Syuzo Kanzaki; Masaaki Obata, all of Aichi, Japan

[73] Assignees: Japan as represented by Director General of Agency of Industrial Science and Technology; Fine Ceramics Research Association, both of Tokyo, Japan

[21] Appl. No.: 08/766,317

[22] Filed: Dec. 13, 1996

[30] Foreign Application Priority Data

Dec. 14, 1995 [JP] Japan .................................. 7-348099

[51] Int. Cl.⁶ .................... C04B 35/584; C04B 35/593
[52] U.S. Cl. .................... 264/639; 264/650; 264/656; 264/665; 264/683
[58] Field of Search .................... 264/639, 650, 264/683, 656, 665

[56] References Cited

U.S. PATENT DOCUMENTS

| 4,388,255 | 6/1983 | Simpson | 264/43 |
| 4,603,116 | 7/1986 | Smith | 264/683 |
| 4,886,767 | 12/1989 | Goto et al. | 501/97 |
| 5,603,877 | 2/1997 | Kato et al. | 264/683 |

OTHER PUBLICATIONS

American Ceramic Society Bulletin, vol. 57, No. 12, pp. 1119–1122, 1978, Masaaki Kuriyama, et al., "Thermal Conductivity of Hot–Pressed $Si_3N_4$ by the Laser Flash Method".

Journal of the Ceramic Society of Japan, vol. 92, No. 2, pp. 174–181, 1989, Koji Watari, et al., "Temperature Dependence of Thermal Coefficients for HIPped Silicon Nitride".

Journal of Materials Science Letters, vol. 3, pp. 915–916, 1984, M. Mitomo, et al., "Thermal Conductivity of α–Sialon Ceramics".

Journal of the Ceramic Society of Japan, vol. 101, No. 9, pp. 1078–1080, 1993, Kiyoshi Hirao, et al., "Preparation of Rod–Like $\beta$–$Si_3N_4$ Single Crystal Particles".

*Primary Examiner*—James Derrington
*Attorney, Agent, or Firm*—Oblon, Spivak, McClelland, Maier & Neustadt, P. C.

[57] ABSTRACT

The present invention provides silicon nitride ceramics having high thermal conductivity and a method for production thereof. This invention relates to a method for producing a silicon nitride sintered body having a microstructure with silicon nitride crystals oriented uniaxially and exhibiting high thermal conductivity of 100 to 150 W/mK in the direction parallel to the orientation direction of the crystals, which comprises of preparing a slurry by mixing a mixed powder of a sintering auxiliary, beta-silicon nitride single crystals as seed crystals and a silicon nitride raw powder with a dispersing medium, forming the slurry by tape casting or extrusion forming, calcining the formed silicon nitride body with beta-silicon nitride single crystals oriented parallel to the casting plane to remove the organic components, densifying it by hot pressing and the like if required, and further annealing it at 1700 to 2000° C. under the nitrogen pressure of 1 to 100 atmospheres.

4 Claims, 3 Drawing Sheets

METHOD OF PRODUCING SILICON NITRIDE CERAMICS HAVING THERMAL HIGH CONDUCTIVITY

DESCRIPTION OF THE INVENTION

The present invention relates to silicon nitride ceramics having high thermal conductivity and excellent characteristic, and a method for production thereof, and more specifically it relates to silicon nitride ceramics with anisotropic microstructure having high thermal conductivity to be used as a high-temperature structural material and a high thermal conductivity substrate for a thermal engine, a heat exchanger, a heat pipe and the like, and a method for production thereof.

The above silicon nitride ceramics having high thermal conductivity of the present invention are useful as a high-temperature structural material and a high thermal conductivity substrate material for a high-temperature thermal engine, a high-temperature heat exchanger, a high-temperature heat pipe and the like, which require high thermal conductivity and mechanical strength.

BACKGROUND OF THE INVENTION

Generally, a silicon nitride sintered body is produced by adding a sintering auxiliary selected from MgO, CaO, $Al_2O_3$, $Y_2O_3$, $Yb_2O_3$, $HfO_2$, $Sc_2O_3$, $Ce_2$, $ZrO_2$, $SiO_2$, $Cr_2O_3$ and AlN to an alpha-type or beta-type silicon nitride powder, forming the obtained mixed powder and sintering it at 1600 to 2100° C. under a nitrogen pressure of 1 to 100 atmospheres. Further, the silicon nitride sintered body is produced by sealing such a mixed powder in a glass capsule and sintering it by HIP (hot isostatic pressing) under a gas pressure of about 1000 atmospheres, or sintering it by HP (hot pressing) under a pressure of about 20 to 40 MPa at 1600 to 1800° C. under a nitrogen pressure of 1 atmosphere.

However, the thermal conductivity of the silicon nitride sintered bodies obtained according to these prior arts is not so high of 10 to 70 W/mK.

Hereunder, the thermal conductivities of silicon nitride sintered bodies obtained according to the prior arts are exemplified.

Example 1) Am. Ceram. Soc. Bull., Vol. 57 No. 12, pp. 119–1122 (1978)

The thermal conductivity of a sintered body obtained by adding 15.4 mol % of MgO to an alpha-silicon nitride ponder and sintering it by hot pressing at 1750° C. for 30 minutes under a pressure of 20 MPa is 55 W/mK.

The thermal conductivity of a sintered body obtained by adding 31 mol % of $Al_2O_3$ to an alpha-silicon nitride powder and sintering it by hot pressing at 1750° C. for 30 minutes under a pressure of 20 MPa is 10 W/mK.

Example 2) J. Ceram. Soc. Jpn., 92 [2], pp. 174–81 (1989)

The thermal conductivity of a sintered body obtained by adding 6 mol % of $Y_2O_3$ to an alpha-silicon nitride powder and sintering it by HIP at 1850° C. for one hour under a pressure of 60 MPa is 70 W/mK.

Example 3) J. Mater. Sci., [3], pp 915–16 (1984)

The thermal conductivity of a sintered body obtained by adding 5 weight % of MgO to an alpha-silicon nitride powder and sintering it by hot pressing at 1700° C. for one hour under a pressure of 14.7 MPa is 56 W/mK.

Example 4) Test Example by the Present Inventors

The thermal conductivity of a sintered body obtained by adding 5 weight % of $Y_2O_3$ and 2 % weight of $Al_2O_3$ to an alpha-silicon nitride powder, forming the mixture by a mold, further forming it by CIP under a pressure of 5 tons/cm² and sintering it at 1850° C. for 6 hours under the nitrogen pleasure of 9 atmospheres is 25 W/mK.

As described above, all silicon nitride sintered bodies obtained according to the prior arts have low thermal conductivity and leave the door open further improvements, and hence the development of a new sintered body having high thermal conductivity has been demanded fairly in the field concerned.

In addition, in the case of metal materials to be used widely (copper, stainless steel, etc.), it is impossible to use them without performing cooling, since strength, oxidation-proof property and corrosion resistance of them are reduced remarkably under the condition beyond 500° C.; on the other hand, it becomes quite difficult to use them for a heat-radiation substrate material of an IC and the like to be used below 100° C., since it requires insulation of it. In addition, in the case of ceramics having high thermal conductivity like aluminum nitride and silicon carbide, it has been difficult to employ them fog practical use since they are lacking in mechanical strength.

SUMMARY OF THE INVENTION

The present invention provides silicon nitride ceramics having high thermal conductivity and a method for production thereof. This invention relates to a method for producing a silicon nitride sintered body having a microstructure with silicon nitride crystals oriented uniaxially and exhibiting high thermal conductivity of 100 to 150 W/mK in the direction parallel to the orientation direction of the crystals, which comprises of preparing a slurry by mixing a mixed powder of a sintering auxiliary beta-silicon nitride single crystals as seed crystals and a silicon nitride raw powder with a dispersing medium, forming the slurry by tape casting or extrusion forming, calcining the formed silicon nitride body with beta-silicon nitride single crystals oriented parallel to the casting plane to remove the organic components, densifying it by hot pressing and the like if required, and further annealing it at 1700 to 2000° C. under the nitrogen pressure of 1 to 100 atmospheres. According to the present invention, a silicon nitride sintered body having high thermal conductivity can be produced conveniently and inexpensively. In addition, silicon nitride ceramics having an anisotropic microstructure obtained according to the method of the present invention have high thermal conductivity of beyond 120 W/mK in the direction parallel to the fiber alignment of silicon nitride crystals developed fibrously, and are useful as a high-temperature structural material and a high thermal conductivity substrate material for a high-temperature thermal engine, a high-temperature heat exchanger, a high-temperature heat pipe and the like which require high thermal conductivity and mechanical strength.

DETAILED DESCRIPTION OF THE INVENTION

Figure 1:
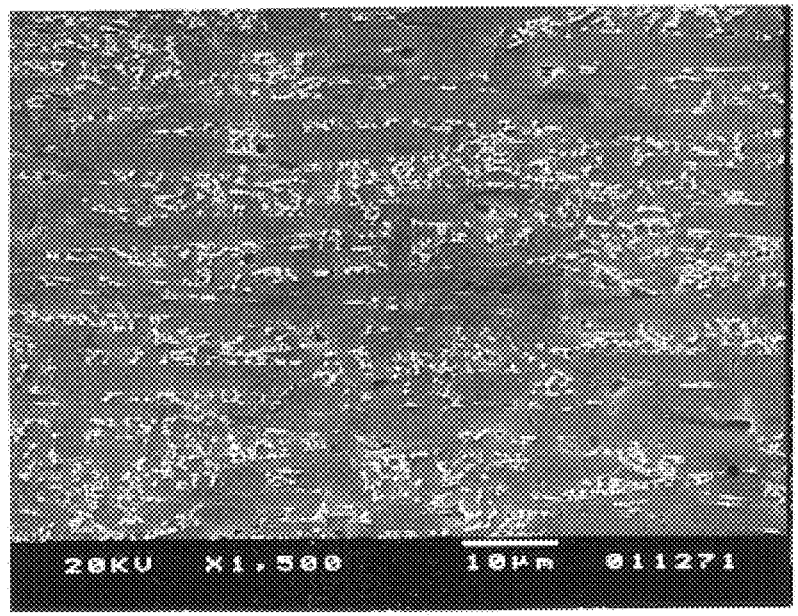
FIGS. 1, 2 and 3 show scanning electron microscope photographs (×1500) of the microstructure (polished and plasma-etched surface) of a specimen shown in FIG. 4 annealed at 1850° C. for 24 hours under a nitrogen pressure of 9 atmospheres according to an Example of the present invention.
Figure 2:
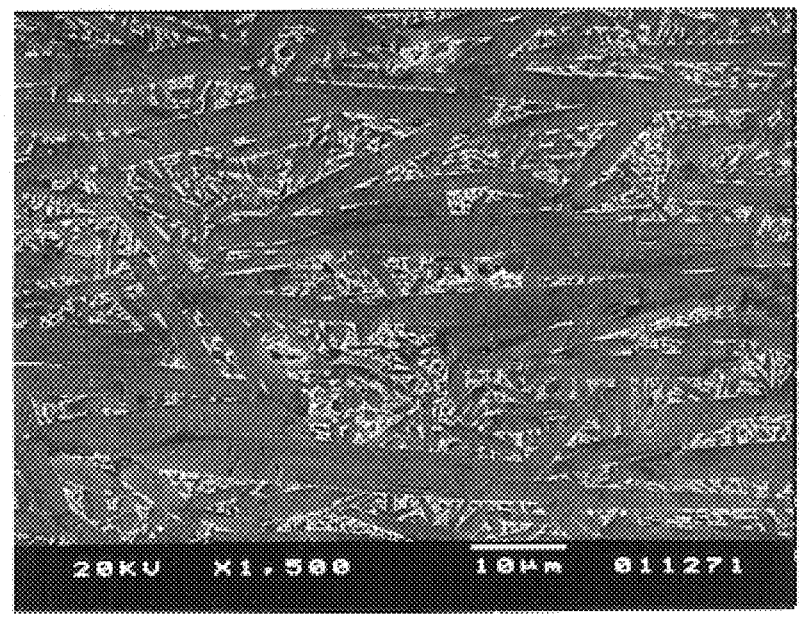
Figure 3:
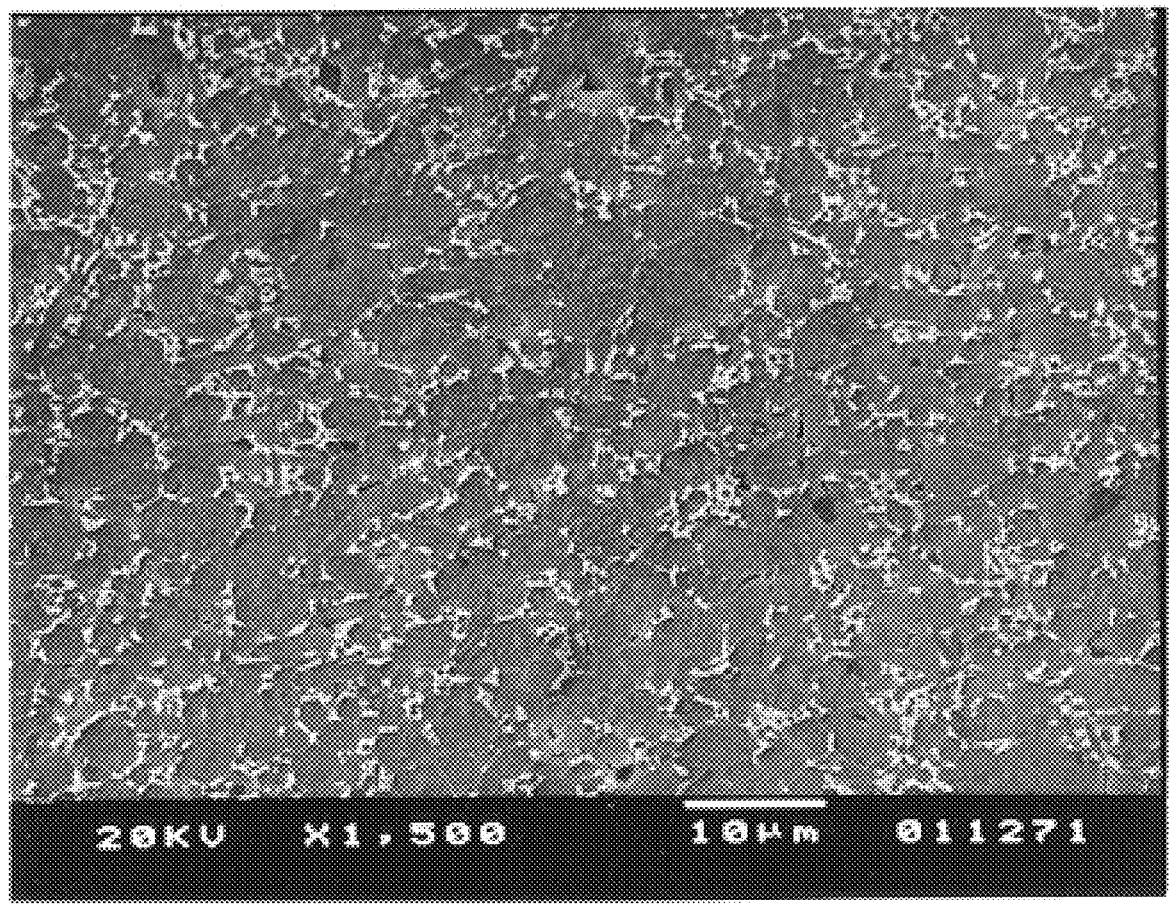
Figure 4:
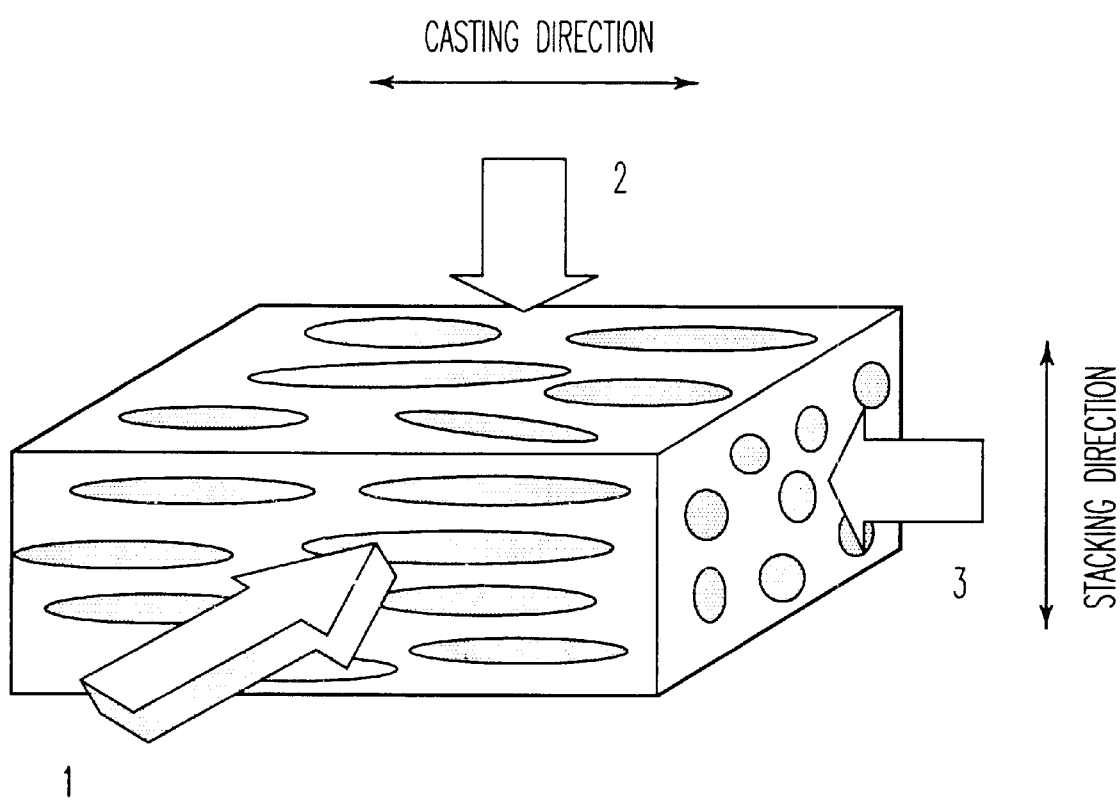

Under thesis circumstances, taking the above prior arts into consideration, the present inventors have engaged in assiduous studies with a view to developing a new method for producing a high-temperature structural material having high thermal conductivity and high mechanical strength conveniently and inexpensively, and as a result have found that in producing silicon nitride ceramics, if the silicon nitride is sintered by adding fine silicon nitride single crystals to it, long rod-like silicon nitride crystals develop from the single crystals as nuclei, and that a silicon nitride sintered body having a microstructure with silicon nitride crystals oriented uniaxially can be produced by orienting silicon nitride single crystals as nuclei in the direction parallel to the casting planes which has led to the accomplishment of tho present invention.

It is an object of the present invention to provide a method for producing a silicon nitride sintered body having high thermal conductivity, capable of producing a silicon nitride sintered body having high thermal conductivity conveniently and inexpensively, employing a silicon nitride body with silicon nitride single crystals oriented uniaxially or in the direction parallel to the casting plane.

Besides, it is another object of the present invention to provide a silicon nitride sintered body to be used suitably as a high-temperature structural material and a high thermal conductivity substrate material for a high-temperature thermal engine, a high-temperature heat exchanger, a high-temperature heat pipe and the like, which require high thermal conductivity and mechanical strength.

The present invention solving the above subject relates to a method for producing a silicon nitride sintered body having a microstructure with silicon nitride crystals oriented uniaxially and exhibiting high thermal conductivity of 100 to 150 W/mK in the direction parallel to the orientation direction of the crystals, which comprises of preparing a slurry by mixing a mixed powder of a sintering auxiliary, beta-silicon nitride single crystals as seed crystals and a silicon nitride raw powder with a dispersing medium, forming the slurry by tape casting or extrusion forming, calcining the formed silicon nitride body with beta-silicon nitride single crystals oriented parallel to the casting plane to remove the organic components, densifying it by hot pressing and the like if required, and further annealing it at 1700 to 2000° C. under the nitrogen pressure of 1 to 100 atmosphere.

Moreover, the present invention relates to a silicon nitride sintered body having a microstructure with silicon nitride crystals oriented uniaxially and exhibiting high thermal conductivity of 100 to 150 W/mK in the direction parallel to the orientation direction of the crystals obtained according to the method for production described above.

Hereafter the present invention will be described in more detail.

In order to produce a silicon nitride sintered body having high thermal conductivity according to the present invention, first of all, a prescribed amount of a sintering auxiliary is added to a silicon nitride raw powder. As a silicon nitride material may be employed alpha-type and beta-type crystal materials; it is desirable to employ a fine powder with an average particle diameter of less than 1 um. As a sintering auxiliary can be employed those generally used such as MgO, CaO, $Y_2O_3$, $Yb_2O_3$, $HfO_2$, $Sc_2O_3$, $CeO_2$, $ZrO_2$ and $SiO_2$. However, $Al_2O_3$ or AlN, which has been employed most ordinarily, is dissolved in silicon nitride in sintering and causes the lowering of the thermal conductivity of the silicon nitride remarkably, and hence it is better to avoid the use thereof. The combination of these sintering auxiliaries and the amount thereof to be added vary according to a method of densifying (gas-pressure sintering, hot pressing, hot isostatic pressing); since these sintering auxiliaries remain in a specimen as a second phase having low thermal conductivity, it is preferable to adjust the amount thereof to the smallest capable of densifying. In addition, with a view to obtain a silicon nitride with anisotropic rod-like particles developed in sintering, a sintering auxiliary preferably containing a rare earth oxide such as $Y_2O_3$, $Yb_2O_3$ and the like is used preferably.

In mixing those materials, an ordinary machine employed for mixing or kneading a powder can be used. The mixing may be performed according to a wet method or a dry method; preferably it is performed according to the wet method. In wet mixing, solvents such as water, methanol, ethanol and toluene are used, and an organic solvent is used preferably with a view to controlling the oxidation of silicon nitride. In the case of using an organic solvent, the mixing can be performed more effectively by employing a dispersing agent such as cationic cellulose and the like.

Next, 1 to 30 volume % of rod-like beta-silicon nitride single crystals are added to the thus obtained mixed powder as seed particles. If the amount of the single crystals added is less than 1 volume %, sufficient rod-like particles cannot be introduced into a sintered body. On the other hand, if it exceeds 30 volume %, the seed crystals added inhibit sintering, and densified sintered body cannot be obtained; hence the amount of the seed crystals to be added are adjusted to 1 to 30 volume %. Regarding the short diameter of seed crystals, it is preferable that the short diameter of them is larger than the average particle diameter of a silicon nitride raw powder employed, and that the aspect ratio of them is more than 2. If the short diameter of seed crystals is smaller than the average particle diameter of tho powder, they dissolve into the auxiliary during sintering and fail to play the role of seed crystals. On the other hand, if the aspect ratio of them is less than 2, seed crystals cannot be oriented sufficiently in tape casting and the like.

As the rod-like beta-silicon nitride single crystals to be employed as seed particles can be used commercially available beta-silicon nitride whiskers; however, they are not uniform in size and contain a lot of lattice defects and impurities, and hence it is preferable to employ, for example, rod-like beta-silicon nitride single crystals with a high purity and a uniform size prepared according to the technique reported in J. Ceram. Soc. Jpn., 101 [9], pp. 1078–80 (1993). In adding seed crystals to a raw powder, it is important to add the seed crystals into a slurry obtained by mixing a silicon nitride material and a sintering auxiliary according to the above wet mixing sufficiently by a technique such as ultrasound dispersion and pot mixing employing a resin pot and a resin coat ball.

Next, a proper amount of an organic binder such as polyvinyl butyral is added to and mixed with the thus obtained mixed slurry, and then the mixture is formed into a formed body employing tape casting according to the doctor-blade method or extrusion to orient seed crystals. In particular, in the case of tape casting, after the casting, the sheets is stacked under a heat-pressure to obtain the sheets with a prescribed thickness.

Next, the above cast body is, first of all, calcined at a temperature of about 600 to 1000° C. to remove the binder, densified by the hot pressuring technique, and then annealed at a temperature of 1700 to 2000° C. under a nitrogen pressure of 1 to 200 atmospheres to obtain large elongated grains developed from seed crystals as nuclei. At this time, pressure, temperature and time conditions in the hot pressing treatment are selected so that the specimen should be densified to have a relative density of more than 97% The hot pressing treatment is preferably performed at a temperature of 1600 to 1850° C. under a pressure of 20 to 40 MPa in a following of nitrogen atmosphere. In addition, when densifying can be performed by annealing in a following nitrogen atmosphere by selecting an auxiliary system, a hot pressing treatment can be omitted. Moreover, it is important in the annealing to develop rod-like beta-silicon nitride from seed crystals sufficiently. The thus obtained silicon nitride sintered body according to the present invention has a microstructure with oriented large rod-like beta-silicon nitride epitaxially developed from seed crystals as nuclei.

As described above, the present inventors have succeeded in producing a silicon nitride sintered body having a microstructure with silicon nitride crystals oriented uniaxially by orienting the silicon nitride single crystals as nuclei parallel to the casting plane, on the basis of the finding that when silicon nitride is sintered by adding fine silicon nitride single crystals in the silicon nitride, long-rod-like silicon nitride crystals develop from the crystals added as nuclei.

A silicon nitride sintered body produced according to the present method exhibits high thermal conductivity duo to the reduction of a crystal grain boundary causing resistance in thermal conductivity to the orientation direction. At the sane time, such a microstructure is desirable for reinforcing the strength and toughness of silicon nitride ceramics; hence mechanical strength and high thermal conductivity can be achieved simultaneously.

As described above, the present invention has been achieved, on the basis of the finding that silicon nitride ceramics having a microstructure comprising silicon nitride crystals developed fibrously from rod-like beta-silicon nitride single crystals as nuclei can be obtained by the processes which comprises of mixing a sintering auxiliary accelerating liquid phase sintering, fine rod-like beta-silicon nitride single crystals and a silicon nitride raw powder, preparing a formed body with rod-like beta-silicon nitride single crystals oriented uniaxially or in the direction parallel to the casting plane from the mixed powder, sintering the formed body and annealing the resultant product. Silicon nitride ceramics having an anisotropic microstructure obtained according to the method of the present invention have high thermal conductivity beyond 120 W/mK in that direction parallel to the fiber alignment of silicon nitride crystals developed fibrously, and are useful as a high-temperature structural material and a high thermal conductivity substrate material for a high-temperature thermal engine, a high-temperature heat exchanger, a high-temperature heat pipe and the like, which require high thermal conductivity and mechanical strength.

EXAMPLES

Hereafter the present invention will be described specifically according to Examples; however, the present invention is restricted to said Examples by no means.

Example 1

(1) Preparation of beta-Silicon Nitride Single Crystals

To 30 g of an alpha-$Si_3N_4$ raw powder having a specific surface area of 5 $m^2$ were added 2.418 g of $Y_2O_3$ and 0.322 g of $SiO_2$ and the mixture was planetary milled with methanol as a dispersion medium by using a silicon nitride ball and a pot. Then the methanol was removed by a vacuum evaporator; the resultant product was dried at 120° C. under vacuum and allowed to pass a 60-mesh sieve to obtain a compound for preparing seed crystals. The compound was put into a silicon nitride crucible and heated at 1850° C. for 2 hours under a nitrogen pressure of 5 atmospheres; the obtained aggregate was further pulverized to a 60-mesh size. The thus obtained powder was treated with an aqueous mixed solution of hydrofluoric acid and nitric acid (hydrofluoric acid/nitric acid/water=43/5/50 volume %), sulfuric acid, dilute hydrofluoric acid and ammonia water in order, and $Y_2O_3$ and $SiO_2$ as glass phase components were removed to obtain rod-like beta-silicon nitride single crystals with a short diameter of 1 $\mu$m and a long diameter of 10 $\mu$m as seed particles. The seed crystals had an extremely high purity with the oxygen content of less than 0.26% and the yttrium content of less than 1.3 ppm.

(2) Preparation of a Silicon Nitride formed Body

Powders of alpha-$Si_3N_4$ (specific surface area: 10 $m^2$/g, average-particle diameter: 0.1 um) with 5 weight % of $Y_2O_3$ as a sintering auxiliary and 3 weight % of a dispersing agent (Diamine RRT manufactured by Kao Corporation, Japan) were planetary milled with a mixed solvent of toluene and butanol (toluene: 80 volume %, butanol: 20 volume %) as a mixing medium, employing a silicon nitride ball and a pot for 3 hours. The seed particles were mixed with the above obtained slurry by ball milling employing a resin pot and a resin coat ball for 24 hours. The amounts of the added seed particles were 5% in volume. Furthermore, 9 weight % of an organic binder (polyvinyl butyral resin) and 2.25 weight % of a plasticizer (dioctyl adipate) were added to the powder and the mixture was mixed for 48 hours. The thus obtained slurry was formed into a green sheet with a thickness of 100 $\mu$m according to tho doctor-blade method. As a result of examining the green sheet by a scanning electron microscope, it was found that the seed crystals in the sheet were oriented parallel to the casting direction (parallel to the direction of slurry flowed).

(3) Preparation of a Silicon Nitride Sintered Body

The green sheets were punched into a rectangular shape of 45×50 mm and 300 thereof were stacked at 130° C. under a pressure of 70 kg/$cm^2$, aligned in the casting direction. The stacked sheets wage calcined at 600° C. under a flow of 95% $N_2$ and 5% $H_2$ gas mixture for 2 hours, to remove the organic binder. The calcined body was hot-pressed at a temperature of 1800° C. for 2 hours under a pressure of 40 mpa to obtain densified specimen. The specimen could be densified to 99% of theoretical density by hot pressing. Thereafter, the hot-pressed specimen were set in a carbon crucible gilled with a $Si_3N_4$ powder, and were annealed at 1850° C. for 24 hours under a nitrogen pressure of 9 atmospheres to form large elongated grains.

The annealed specimen had a microstructure with large elongated grains oriented parallel to the casting direction, as shown in the scanning electron microscope photographs of FIG. 1.

(4) Characteristics of the Silicon Nitride Sintered Body

The thus obtained specimen was punched perpendicular to the casting direction and machined to make a disk of 2 mm in thickness, and the thermal conductivity thereof measured by a laser flash method (namely, thermal conductivity parallel to the orientation direction of large elongated grain was measured) was 120 W/mK.

Referential Example 1

The thermal conductivity of silicon nitride ceramics produced in the same manner as in Example 1 except that no beta-silicon nitride single crystal had been added was 55 W/mK.

Referential Example 2

The thermal conductivity of silicon nitride ceramics produced in the same manner as in Example 1 except that the forming method had been changed to a mold pressing method was 50 W/mK.

Referential Example 3

The thermal conductivity of silicon nitride ceramics produced in the same manner as in Example 1 except that the annealing treatment after hot pressing had not been performed was 30 W/mK.

According to the present invention, a silicon nitride sintered body having high thermal conductivity can be produced conveniently and inexpensively. In addition, silicon nitride ceramics having an anisotropic microstructure obtained according to tho method of the present invention have high thermal conductivity of beyond 120 W/mK in the direction parallel to the fiber alignment of silicon nitride crystals developed fibrously, and are useful as a high-temperature structural material and a high thermal conductivity substrate material for a high-temperature thermal engine, a high-temperature heat exchanger, a high-temperature heat pipe and the like, which require high thermal conductivity and mechanical strength.

What is claimed is:

1. A method for producing a silicon nitride sintered body having a microstructure with silicon nitride crystals oriented uniaxially and exhibiting high thermal conductivity of 100 to 150 W/mK in the direction parallel to the orientation direction of the crystals, which comprises preparing a slurry by mixing a mixed powder of a sintering auxiliary, beta-silicon nitride single crystals as seed crystals and a silicon nitride raw powder with a dispersing medium, forming the slurry by tape casting or extrusion forming, calcining the formed silicon nitride body with the beta-silicon nitride single crystals oriented parallel to the casting plane to remove organic components, densifying it by hot pressing, and further annealing it at 1700 to 2000° C. under the nitrogen pressure of 1 to 100 atmospheres for a time sufficient to attain the thermal conductivity of 100 to 150 W/mK in that direction.

2. The process according to claim 1, wherein the beta-silicon nitride seed crystals have an aspect ratio of more than 2 and wherein the short diameter of the seed crystals is larger than the particle diameter of a silicon nitride material raw powder.

3. The process according to claim 2 wherein the aspect ratio of the seed crystals is of the order of 10.

4. The process according to claim 3, wherein the annealing is carried out for a time of 24 hours.

* * * * *

UNITED STATES PATENT AND TRADEMARK OFFICE
CERTIFICATE OF CORRECTION

PATENT NO. : 5,902,542
DATED : May 11, 1999
INVENTOR(S) : Kiyoshi HIRAO, et al.

It is certified that error appears in the above-identified patent and that said Letters Patent is hereby corrected as shown below:

On the title page item [54] and on top of column 1, the title should be:

--[54] METHOD OF PRODUCING SILICON NITRIDE CERAMICS HAVING HIGH THERMAL CONDUCTIVITY--

Signed and Sealed this

Eleventh Day of April, 2000

*Attest:*

Q. TODD DICKINSON

*Attesting Officer*  *Director of Patents and Trademarks*